United States Patent [19]
Zepf

[11] Patent Number: 4,645,255
[45] Date of Patent: Feb. 24, 1987

[54] LOAD HOOK

[76] Inventor: Hans R. Zepf, Hirsackerstr. 30, Horgen, Switzerland

[21] Appl. No.: 852,403

[22] Filed: Apr. 16, 1986

Related U.S. Application Data

[63] Continuation of Ser. No. 191,332, Feb. 16, 1980, abandoned.

[30] Foreign Application Priority Data

Jun. 16, 1978 [DE] Fed. Rep. of Germany ....... 2826541

[51] Int. Cl.[4] .......................... B66C 1/36; B66F 19/00
[52] U.S. Cl. ............................. 294/82.19; 24/230.5 R; 24/241 P; 294/82.1
[58] Field of Search ................... 294/82.1, 82.11, 82.17, 294/82.19–82.21; 24/230.5 R, 230.5 AD, 232–235, 241 P, 241 PP, 241 PS, 241 SB, 241 SP; 37/117.5, DIG. 3, DIG. 12; 59/89, 93; 248/304, 306; 280/504; 414/607, 703, 723, 724

[56] References Cited

U.S. PATENT DOCUMENTS

| | | | |
|---|---|---|---|
| 1,386,894 | 8/1921 | Myrmo | 24/241 PS |
| 1,411,230 | 3/1922 | Weber | 280/504 |
| 1,616,350 | 2/1927 | Clavier | 24/235 |
| 1,678,993 | 7/1928 | Marshall | 24/241 P |
| 1,702,830 | 2/1929 | Jordan | 280/504 |
| 2,491,143 | 12/1949 | Weiss | 24/241 P X |
| 3,159,891 | 12/1964 | Brewer | 24/235 X |
| 3,317,972 | 5/1967 | Harley | 24/241 P |
| 3,421,642 | 1/1969 | Carter | 414/724 |
| 3,814,269 | 6/1974 | Blood et al. | 294/82.1 X |
| 3,831,229 | 8/1974 | Craven | 24/235 |

FOREIGN PATENT DOCUMENTS

| | | | |
|---|---|---|---|
| 902545 | 1/1954 | Fed. Rep. of Germany | 294/82.1 |
| 11843 | 9/1924 | Netherlands | 24/235 |

Primary Examiner—Johnny D. Cherry
Attorney, Agent, or Firm—Murray Schaffer

[57] ABSTRACT

The load hook provided for fixing to a dredging or excavating shovel or bucket has a hook body (1) surrounding an elongated hook space (2), whose axis (4) is inclined relative to a bearing surface (11) of a base part (5) provided on the hook body. A hook mouth (3) is directly linked to the base part (5) and is directly locked by a safety catch (6). Due to the inclined position of the axis (4) there is easy access to the hook mouth and base part (5) substantially forms part of the hook body (1).

6 Claims, 5 Drawing Figures

U.S. Patent  Feb. 24, 1987  4,645,255
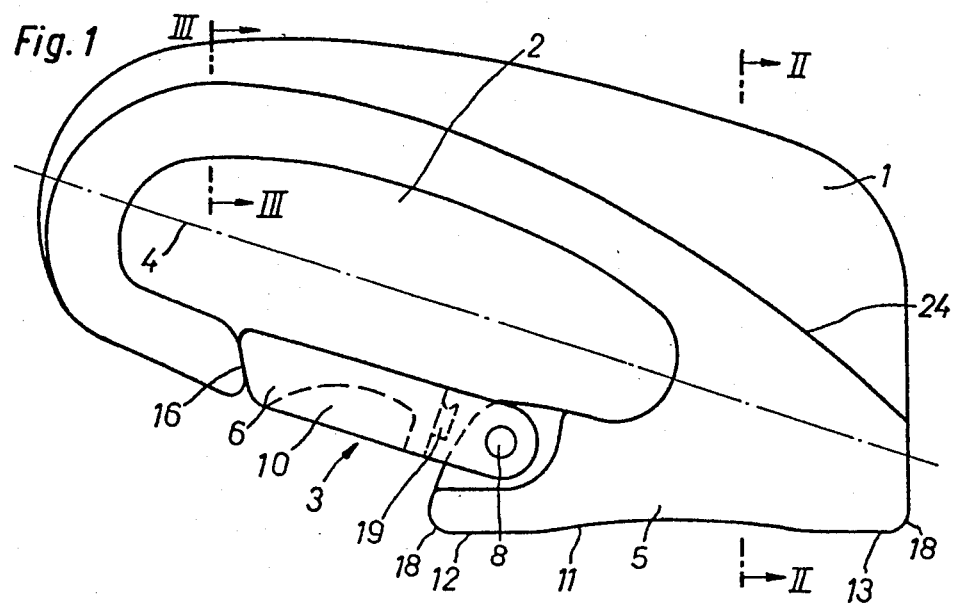
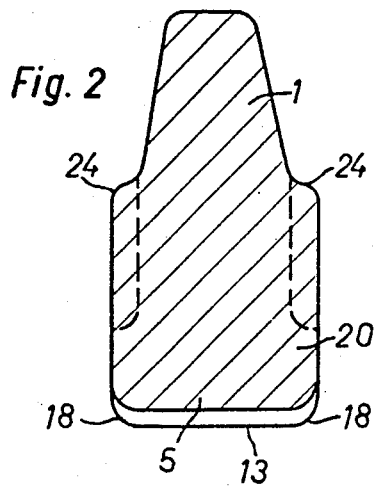
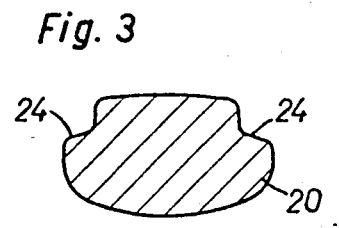
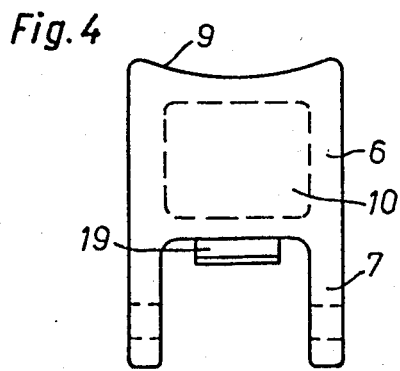
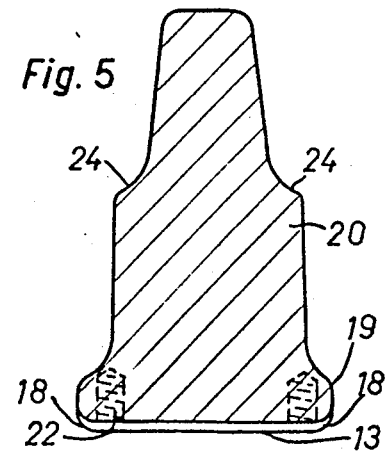

LOAD HOOK

This is a continuation of application Ser. No. 191,332 filed 2-16-80, now abandoned.

The invention relates to a load hook for load application in two approximately opposite directions, provided with a safety catch and with a base part for fixing to a lifting apparatus, particularly to a dredging or excavating shovel or bucket, the safety catch and the hook mouth covered by the safety catch for inserting a chain link or cable flange being arranged on the side and in the vicinity of the base part.

Many load hook constructions are known and in them the hook mouth is locked by a safety catch, which for the purpose of inserting a chain link or a cable flange must be pressed counter to the tension of a spring. In the case of excavators it is known to fix a load hook to the shovel or bucket, so that the excavator can also be used as a lifting apparatus. Loads of all types, e.g. pipes, site tools, toolboxes and the like are raised and transported. As the bucket or shovel can be brought into various positions the load hook must be able to take up forces in two approximately opposite directions and guide them to the shovel or bucket. However, as the buckets are mainly used for excavating, the load hook must be constructed in such a way that it still remains operable when introduced into the soil several times. For this reason in a known load hook of this type the hook mouth is positioned on the side of the attachment point. A disadvantage of this load hook is the kidney-shaped configuration of the hook space surrounded by the hook body. When load is applied to the two ends of this hook space, additional bending forces occur which attempt to stretch the kidney-shaped hook space. A further disadvantage is that the kidney-shaped hook space limits the insertion width to the hook mouth, so that the base part, with the aid of which the load hook is fixed to the lifting apparatus is connected to the hook body in such a way that the latter is at a distance from the bearing surface of the base part. In practice this is brought about by welding the base part to the hook body. However, this leads to a weak point within the hook body, which is not permitted by the safety regulations of many countries. The kidney-shaped configuration of the hook space is consequently the reason for fixing the permitted load at a lower level.

The problem of the present invention is to so further develop the load hook of the type described hereinbefore that the above-mentioned disadvantages do not occur and that for comparable relative sizes the load hook can be designed for a much higher permitted load and at the same time the lateral stability, i.e. the usability when lateral forces occur, is improved. Furthermore there is a material saving, without impairing access to the hook mouth.

According to the invention this problem is solved in that the base part is formed by part of the hook body surrounding a free elongated hook space, whose longitudinal axis is inclined towards and away from the bearing surface of the base part.

The invention will be described in greater detail hereinafter relative to non-limitative embodiment and with reference to the attached drawings, wherein show:

FIG. 1 a side view of a load hook according to the invention.

FIG. 2 a cross-section through the load hook of FIG. 1 along line II—II.

FIG. 3 a cross-section through the load hook of FIG. 1 along the line III—III.

FIG. 4 a plan view of a safety catch for locking the hook mouth.

FIG. 5 a cross-section similar to that of FIG. 2 for a load hook for fastening to its attachment point.

The load hook shown in FIG. 1 has an annular hook body 1 with an oval shape surrounding an elongated, oval hook space 2. The hook body 1 forms on one side a base part 5, which at its free end carries a pivotable safety catch 6. Safety catch 6 locks a hook mouth 3 formed by the hook body 1 and through which can be inserted a chain link or a cable flange for raising loads. As can be gathered from FIG. 4 the safety catch 6 has two arms 7 by means of which it can be pivoted to the base part 5 of hook body 1 using a bolt 8. As is apparent from FIG. 1 the safety catch 6 has a recess 10 for material saving purposes and whose rectangular shape can be seen in FIG. 4. The safety catch 6 has a curved and inclined edge 9, which is supported on an inclined surface 16 of hook body 1. Advantageously the safety catch 6 is pressed by a not shown spring onto the inclined surface 16. For this purpose it is possible to use a spring with a bracket mounted on the bolt and which is supported on a supporting edge arranged between the arms 7, whilst the ends of the spring are supported on the base part 5.

It is important that the hook space 2 has a longitudinal axis 4 which is directed away from the bearing surface of base part 5.

As can be gathered from FIG. 1 the bearing surface 11 is slightly curved and forms bearing points 12, 13 at the narrow sides. As is apparent from FIGS. 2 and 5 the bearing point 13 and in the same way the bearing point 12 is approximately a plane of limited extension. As a result it is possible to mount the load hook on the attachment surface in such a way that it is supported at at least two points, even if the attachment surface is uneven. To enable the load hook to be reliably welded to the attachment surface without any preparatory work being necessary, the edges of the base part have rounded portions 18.

Although the weld on the base part 5 can be made sufficiently large and, due to the rounded portions 18 can be effected in a reliable manner, certain national safety regulations prescribe a weld not only within the hook body, but also at the mounting or attachment point. In this case shoulders 19 are provided or the hook profile 20 on the longitudinal edges of base part 5 and in the area thereof tapped holes 22 are provided. If for example the load hook is fixed to the shovel or bucket of an excavator or dredge, tapped holes 22 are provided in corresponding manner to the bores in the bucket or shovel and the load hook is secured by screws introduced from the inside.

As is shown in FIGS. 2, 3 and 5 hook profile 20 has further shoulders 24 on either side and which, as shown in FIG. 1, extend over most of the hook body 1. As is clear from FIG. 3 the inner boundary of hook space 2 is greatly rounded, so that no additional stresses can occur on the inserted chain link or cable flange.

It is important for axis 4 of hook space 2 to be inclined away from the bearing surface 11 of base part 5. As a result the hook body is given a suitable configuration, which on the one hand facilitates the insertion of a chain link or cable flange, because the axis also simultaneously assumes the approximate direction of the load forces applied and on the other prevents the occurrence of additional bending stresses. An important point is that as a result the base part 5 can essentially be constructed as part of the hook body 1 and a considerable material accumulation at base part 5 is avoided. Since as a result of this the distance from the bearing surface 11 to the force application point can be kept small, the load hook can also absorb much larger lateral forces, i.e. the lateral stability is increased. As the hook profile 20 has substantially the same width as the base part 5, see FIGS. 2 and 3, the said load hook can be used for larger loads. For example load hooks of identical size according to the prior art and according to the invention were compared. The first is designed for 8 t with a 3.6 time safety margin, whilst the latter is designed for 10 t and a 4.5 time safety margin, which corresponds to a load of 12.5 t, with the same safety margin. This great increase in the permitted load is achieved with a decrease and not an increase in material expenditure.

The load hook described hereinbefore is preferably constructed as a forging, as is the safety catch 6. The curved edge 9 of the safety catch 6 is used for the centering thereof, because the arms 7 are not laterally guided in bolt 8 and instead between them space is available for the provision of a locking spring.

What is claimed is:

1. A load hook for attachment of a load supporting cable or chain to a pivotable lifting device, comprising an elongated body having two opposite directed semi-circular ends, each of which have first and second arms, the first arm of each of said semi-circular ends being joined to form a continuous support surface, the second arms being spaced from each other and terminating, to define a mouth for insertion of said cable; a safety catch pivotally secured to the second arm of one of said semi-circular ends and extending toward the second arm of the other of said semi-circular ends to cover said mouth; said semi-circular ends, said catch and said continuous support surface defining an oval hook space having a longitudinal axis passing through the centers of said semi-circular ends; the second arm of said one semi-circular end to which said catch is pivoted being enlarged to form an exterior base providing a bearing surface for securement to said lifting device; the longitudinal axis of said oval hook space being inclined obliquely with respect to said bearing surface; and, said catch and said second arm of each of said semi-circular ends extending parallel to said longitudinal axis to provide a space between said hook body and said lifting device for entry into the mouth thereof, wherein said chain or cable can be supported by said hook body regardless of the position of said lifting device.

2. The load hook according to claim 1 wherein said base is provided with rounded corners at each of its ends.

3. The load hook according to claim 1 wherein said body is provided with laterally extending flanges in the vicinity of the base, said flanges being provided with tapped holes for securement to the lifting device.

4. The load hook according to claim 1, said safety catch is provided with an end having a pair of spaced walls, said walls straddling the end of the second arm of said one, semi-circular end and being pivotally secured thereto by a bolt passing through said walls and second arm.

5. The load hook according to claim 4 wherein said safety catch has an upper edge forming a part of said continuous support surface, said upper edge being concavely curved.

6. The load hook according to claim 5 wherein said safety catch has a lower edge, said lower edge having an inwardly directed recess of rectangular cross-section formed in the lower edge of said safety catch.

* * * * *